3,128,248
METHOD FOR THE PURIFICATION OF BRINE

Hidetomo Suzuki, Ota-ku, Tokyo, Japan, assignor to Ebara-Infilco Kabushiki Kaisha, Tokyo, Japan, a corporation of Japan
No Drawing. Filed Jan. 22, 1962, Ser. No. 167,892
2 Claims. (Cl. 210—44)

The present invention relates to a method for the purification of brine or salt water. Particularly, the invention relates to the improvement in the purification of seawater or brine which consists essentially of precipitating magnesium and calcium hydroxide under novel conditions of coagulation in the presence of from 1 to about 100 parts per million based upon the precipitate of coagulant selected from the group consisting of oil, soap and polyelectrolyte, the coagulant being added prior to separation of the precipitate while introducing air under pressure into the brine and releasing the pressure to entrain the precipitate and collect it at the surface of the brine. This improvement is carried out in order to raise the efficiency of removal of calcium and magnesium ions which are difficult to handle because of their fine particle size; and the present method is adapted for use in the conventional purification process of brine or salt water.

An object of the invention is to provide an improved and excellent purification method of brine, salt water, or sea water, to be utilized for the electrolytic production of soda, for the recovery of salt by evaporation and for the separation of magnesia from sea water. Another object is to provide a method for the purification of brine with a smaller scale apparatus within a shorter period of time. Other objects would be obvious from the following description.

For the purification of brine, heretofore, the brine was treated with sodium hydroxide, NaOH, slaked lime, Ca(OH)$_2$, or sodium carbonate, Na$_2$CO$_3$, to convert the magnesium ion, Mg$^{++}$, to magnesium hydroxide, $$Mg(OH)_2$$

and the calcium ion, Ca$^{++}$, to calcium carbonate, CaCO$_3$, which were separated in the form of a fine precipitate.

This prior art method has, however, the disadvantages of requiring an apparatus for the precipitation and separation process which is very large in size and which must be in the production cycle for long periods of time, especially in the large scale treatment which is needed for handling the large volumes of sea water being processed for their mineral content. The particles of the resulting magnesium hydroxide are so fine that the precipitating velocity is low, and a comparatively longer period of time is required for concentration by settling of the magnesium hydroxide.

Obviating the disadvantages as mentioned above, the present invention provides a method for purification of brine, which comprises adding at least one member of the group of sodium hydroxide, slaked lime, and sodium carbonate, to the brine having magnesium and calcium ions to convert the magnesium ion into magnesium hydroxide precipitate and the calcium ion into calcium carbonate precipitate, while introducing air under pressure at ambient or elevated temperature into the brine, decreasing the pressure to generate bubbles of air in the brine and thereby elevating the precipitated, finely divided magnesium hydroxide and calcium carbonate particles up to the surface of the brine by being entrained in the bubbles of air which go up in the brine, and separating the magnesium hydroxide and calcium carbonate particles by skimming from the brine.

According to the method of the invention, a larger amount of the material brine can be treated by use of an apparatus having a smaller volume than that employed conventionally. Besides, magnesium hydroxide can be separated from the brine more quickly than in the conventional precipitation method, since the velocity of rising or floating of magnesium hydroxide particles to the surface of brine is considerably higher than the velocity of the precipitation. Furthermore, the sludge (magnesium hydroxide and calcium carbonate) raised or floated to the surface has a higher concentration, which facilitate the subsequent treatment. The higher rising velocity may be due to the larger specific gravity of brine and excellent adhesion of the bubbles of air to magnesium hydroxide particles in the brine.

In the method of the invention, a froth agent or coagulant may be employed with more efficient results. The use of such agent facilitates the separation of magnesium hydroxide, since the solid concentration in the sludge raised or floated to the surface is increased. The coagulant employed in the present invention is oils, soaps, polyelectrolytes of natural origin or of a synthetic nature, and the like. It is added to sea water at or after the addition of alkalies thereto in an amount of less than 100 p.p.m. per precipitate.

Moreover, the elevation of treating temperature of the brine increases the rising velocity of the bubbles of air accompanying the magnesium hydroxide particles, as compared with the instance treated at the ordinary temperature. The treatment at an elevated temperature, e.g. 100° C., gives about 9 times higher velocity and about 8 times higher sludge concentration, as compared with the conventional precipitation method.

The invention will be illustrated with reference to the following example.

Example

A brine containing magnesium ion (Mg$^{++}$) and calcium ion (Ca$^{++}$) is added with sodium hydroxide and sodium carbonate. To 40% volume portion of the brine, air is dissolved under pressure of 3.5% kg./cm.$^2$. Then, the brine is mixed again with the remainder (60% volume portion) of the brine and is then decreased up to the atmospheric pressure, whereby particles of magnesium hydroxide and calcium carbonate being raised to the surface of the brine, accompanied by bubbles of air generated. The raised substance is separated from the mother liquor.

The comparative results of the methods of the present invention and the conventional method will be set forth below.

|  | Conventional precipitation method | Method of the invention | |
|---|---|---|---|
| Brine treated: | | | |
| Mg(OH)$_2$ | 4 p.p.m. | 5 p.p.m. | 6 p.p.m. |
| CaCO$_3$ | 2 p.p.m. | 2 p.p.m. | 3 p.p.m. |
| Temperature of the brine. | 10° C. | 10° C. | 50° C. |
| Velocity | 0.3 m./hr. (precipitating). | 0.6 m./hr. (rising). | 2.7 m./hr. (rising). |
| Sludge concentration | 3 g./l. | 6 g./l. | 24 g./l. |
| Volume of sludge | 40 vol. percent. | 20 vol. percent. | 5 vol. percent |
| Coagulant ("Separan" manufactured by Dow Chemical Co., U.S.A.). | 1 p.p.m. | 1 p.p.m. | 1 p.p.m. |

As seen from the table, the rising velocity of the present invention at the ordinary temperature is about two times higher than the precipitating velocity in the conventional method, and the rising velocity at 50° C. is about 9 times higher than that at the ordinary temperature. These results exhibit the superiority of the method of the present invention to the conventional method.

What is claimed is:

1. In a method for removing magnesium and calcium ions from brine and sea water by conversion into magnesium hydroxide and calcium carbonate precipitates after treatment with sodium hydroxide, sodium carbonate and slaked lime, that improvement in the clarification of the sea water and brine being treated which comprises: adjusting the temperature of the water to from 50–100° C.; introducing air under pressure into the water after it is treated with the aforesaid alkaline treating reagent whereby bubbles of air rise to the surface of the water and entrain the finely divided particles of precipitated magnesium hydroxide and calcium carbonate; simultaneously introducing from 1 to 100 parts per million, based upon the weight of the precipitates, of a coagulant selected from the group consisting of oil, soap and polyelectrolyte; and thereafter removing the entrained solids from the top of the water.

2. In a method for removing magnesium and calcium ions from brine and sea water by conversion into magnesium hydroxide and calcium carbonate precipitates after treatment with sodium hydroxide, sodium carbonate and slaked lime, that improvement in the clarification of the sea water and brine being treated which comprises: introducing air under pressure into the water after it is treated with the aforesaid alkaline treating reagent whereby bubbles of air rise to the surface of the water and entrain the finely divided particles of precipitated magnesium hydroxide and calcium carbonate; simultaneously introducing from 1 to 100 parts per million, based upon the weight of the precipitates, of a coagulant selected from the group consisting of oil, soap and polyelectrolyte; and thereafter removing the entrained solids from the top of the water.

References Cited in the file of this patent

UNITED STATES PATENTS

| | | |
|---|---|---|
| 1,317,607 | Williamson | Sept. 30, 1919 |
| 1,333,393 | Edser et al. | Mar. 9, 1920 |
| 1,376,459 | Pedersen | Mar. 3, 1921 |
| 2,522,856 | Buswell | Sept. 19, 1950 |
| 2,920,763 | Lind et al. | Jan. 12, 1960 |